United States Patent
Inoue

(10) Patent No.: US 9,635,244 B2
(45) Date of Patent: Apr. 25, 2017

(54) IMAGE PICKUP APPARATUS

(71) Applicant: OLYMPUS CORPORATION, Shibuya-ku, Tokyo (JP)

(72) Inventor: Yosuke Inoue, Kunitachi (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 15/045,964

(22) Filed: Feb. 17, 2016

(65) Prior Publication Data

US 2016/0342069 A1 Nov. 24, 2016

(30) Foreign Application Priority Data

May 19, 2015 (JP) ................. 2015-102120

(51) Int. Cl.
| | |
|---|---|
| *G03B 13/36* | (2006.01) |
| *G02B 7/04* | (2006.01) |
| *H04N 5/225* | (2006.01) |
| *H04N 5/232* | (2006.01) |
| *G03B 3/10* | (2006.01) |
| *G02B 7/08* | (2006.01) |
| *H02K 41/035* | (2006.01) |

(52) U.S. Cl.
CPC ........... *H04N 5/23212* (2013.01); *G02B 7/08* (2013.01); *G03B 3/10* (2013.01); *H02K 41/0356* (2013.01); *H04N 5/2254* (2013.01)

(58) Field of Classification Search
CPC .......... G01D 5/12; G01D 5/2451; G02B 7/04; G02B 7/102; H04N 5/23212
USPC .................... 396/135, 89, 134, 136
See application file for complete search history.

(56) References Cited

U.S. PATENT DOCUMENTS

| | | | |
|---|---|---|---|
| 2007/0242152 A1* | 10/2007 | Chen .................... | G02B 7/08 348/345 |
| 2015/0198783 A1* | 7/2015 | Shimotsu ............ | G02B 7/08 359/814 |

FOREIGN PATENT DOCUMENTS

JP         2013222116 A    10/2013

* cited by examiner

*Primary Examiner* — Rochelle-Ann J Blackman
(74) *Attorney, Agent, or Firm* — Holtz, Holtz & Volek PC

(57) ABSTRACT

An image pickup apparatus includes: a lens holding frame; a fixed frame; driving magnets arranged at the fixed frame such that magnetic poles are alternately reversed along an optical axis; driving coils arranged at the lens holding frame so as to be opposed respectively to the driving magnets; first detection portions that detect a position of the lens holding frame by detecting a change of a magnetic force of the respective driving magnets; a second detection portion, wherein when it is detected that the lens holding frame has reached a predetermined position, an output signal from the second detection portion at the time of the detection is set as a reference position, and position detection of the lens holding frame after the detection is performed based on the output signal from the second detection portion.

5 Claims, 9 Drawing Sheets

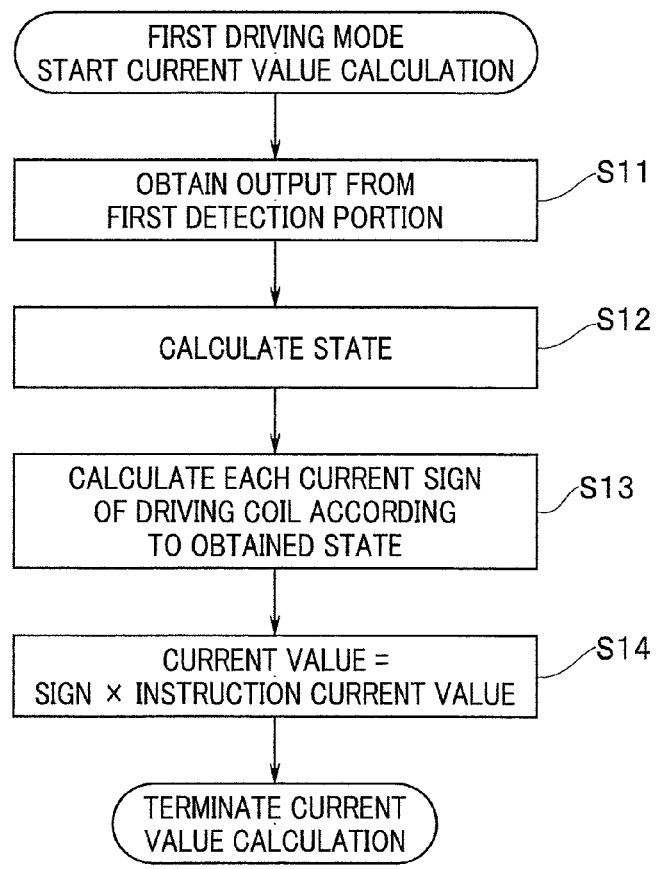

| | STATE | SWITCHING POSITION |
|---|---|---|
| 1 | 1 | a |
| 2 | 2 | b |
| 3 | 3 | c |
| 4 | 4 | d |
| 5 | 1 | e |
| ... | ... | ... |

IMAGE PICKUP APPARATUS

CROSS REFERENCE TO RELATED APPLICATION

This application claims the benefit of Japanese Application No. 2015-102120 filed in Japan on May 19, 2015, the contents of which are incorporated herein by this reference.

BACKGROUND OF THE INVENTION

1. Field of the Invention

The present invention relates to an image pickup apparatus provided with a linear actuator for driving one or more lens groups of an optical system constituted of a plurality of lens groups in a direction along an optical axis.

2. Description of Related Art

Conventionally, image pickup apparatuses such as digital cameras or video cameras have been generally put into practical use and widely spread, and such image pickup apparatuses are configured to sequentially perform photoelectric conversion on optical images formed by an image pickup optical system by using an image pickup device such as a photoelectric conversion device, to store obtained image signals as image data in a predetermined format (for example, digital image data representing still images or moving images) in a storage medium, and configured to be able to display the still images or moving images based on the digital image data by using an image display apparatus.

The image pickup apparatus configured as described above generally includes a lens barrel composed of various constituent members including, for example, a plurality of optical lens groups which constitute an image pickup optical system, a plurality of lens holding frames that respectively hold the plurality of optical lens groups, and a lens driving unit constituted of an actuator or the like for moving one or more lens holding frames among the plurality of lens holding frames in a predetermined direction by a predetermined amount at a predetermined timing.

The types of the image pickup apparatus include, for example, various types such as what is called a lens-integrated type in which a lens barrel is configured to be integrated with a main body portion of the image pickup apparatus, a lens-changeable type in which a lens barrel is configured to be attachable to and detachable from the main body portion of the image pickup apparatus, or the like.

The lens barrel in such types of conventional image pickup apparatus includes a lens driving unit that causes one or more lens groups among a plurality of optical lens groups constituting an image pickup optical system, for example, a focus lens group for performing focus adjusting action to move in a predetermined direction along the optical axis by a predetermined amount at a predetermined timing. An example of the actuator included in the lens driving unit is the one using a linear actuator such as a voice coil motor (VCM).

For example, the image pickup apparatus disclosed in Japanese Patent Application Laid-Open Publication No. 2013-222116, which is provided with a linear actuator for driving an image pickup optical system, includes: a lens holding frame; driving magnets extended in parallel to the optical axis and configured such that the magnetic poles are alternately reversed; driving coils mounted to the lens holding frame so as to be opposed to the driving magnets, and two magnetic sensors that detect the magnetism of the driving magnets and detect the position of (the driving coils mounted to) the lens holding frame, and the linear actuator obtains a driving power for moving the lens holding frame in a direction along the optical axis by controlling the currents to be applied to the driving coils, based on signals from the two magnetic sensors.

SUMMARY OF THE INVENTION

An image pickup apparatus according to one aspect of the present invention includes: a lens holding frame for holding a lens which is movable in a direction along an optical axis; a fixed frame at which the lens holding frame is arranged so as to be movable in the direction along the optical axis of the lens; a plurality of driving magnets formed so as to extend in a direction parallel to the optical axis of the lens, and arranged at the fixed frame such that magnetic poles are alternately reversed along the optical axis; a plurality of driving coils arranged at the lens holding frame so as to be opposed respectively to the plurality of driving magnets, the plurality of driving coils being located at positions where cycles of the magnetic poles of the driving magnets are shifted in the direction along the optical axis; a plurality of first detection portions mounted to the lens holding frame and configured to detect a position of the lens holding frame with respect to the fixed frame by detecting a change of a magnetic force of the plurality of driving magnets; and a second detection portion configured to detect the position of the lens holding frame with respect to the fixed frame, wherein when it is detected that the lens holding frame reaches a predetermined position with respect to the fixed frame, an output signal from the second detection portion at the time of the detection is set as a reference position, and position detection of the lens holding frame after the detection is performed based on the output signal from the second detection portion.

The advantages of the present invention will become more apparent by referring to the following detailed description.

BRIEF DESCRIPTION OF THE DRAWINGS

FIG. 8 is a flowchart of a first driving mode among modes of the lens driving control processing in the image pickup apparatus in FIG. 1.

FIG. 9 is a table showing an example of state data to be referred to in processing in the first driving mode in FIG. 8.

DETAILED DESCRIPTION OF THE PREFERRED EMBODIMENT

Figure 1:
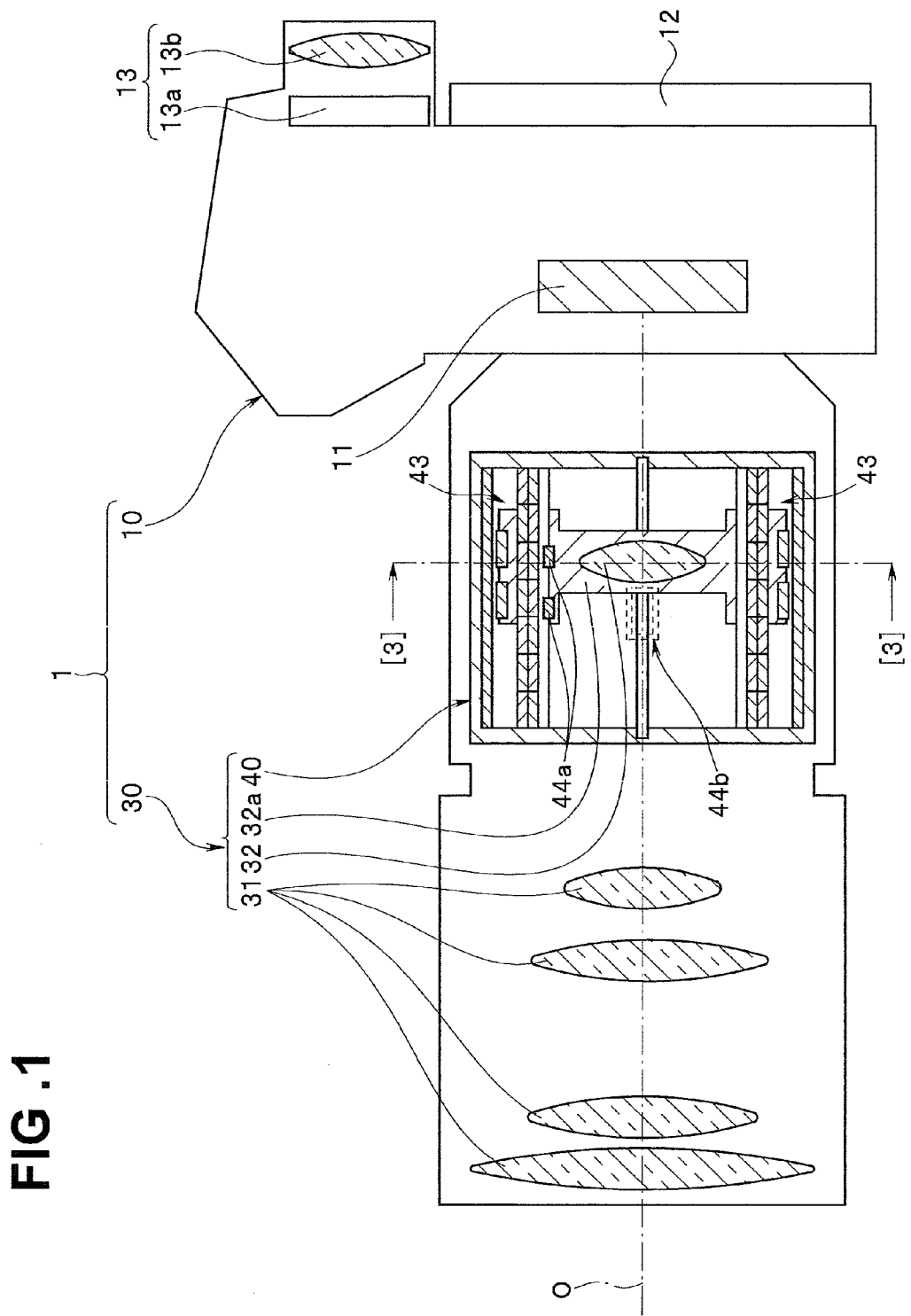
FIG. 1 is a schematic configuration diagram illustrating an overall configuration of an image pickup apparatus according to one embodiment of the present invention.

Hereinafter, the present invention will be described with reference to an embodiment shown in the drawings. One embodiment of the present invention exemplifies an image pickup apparatus, for example, a digital camera, a video camera, or the like, which sequentially performs photoelectric conversion on optical images formed by an image pickup optical system, for example, by using a photoelectric conversion device (hereinafter referred to an image pickup device) such as CCD (Charge Coupled Device) image sensor, or a CMOS (Complementary Metal Oxide Semiconductor) type image sensor, to store image signals obtained by the photoelectric conversion as image data in a predetermined format (for example, digital image data representing still images or moving images) in a storage medium, and which includes an image display apparatus, such as a liquid crystal display (LCD) or an organic electro-luminescence (OEL) display, for reproducing and displaying still images or moving images based on the digital image data stored in the storage medium.

Note that each of the drawings used for the description below is a pattern diagram, and there is a case where the dimensional relationship among the respective members, the scale size, and the like are made different for each of the components in order to allow each of the components to be illustrated in a recognizable size in the drawings. Therefore, the present invention is not limited only to the embodiment shown in the drawings with regard to the number, the shapes, ratio of the sizes of the components, a relative positional relationship among the components, and the like.

Figure 2:
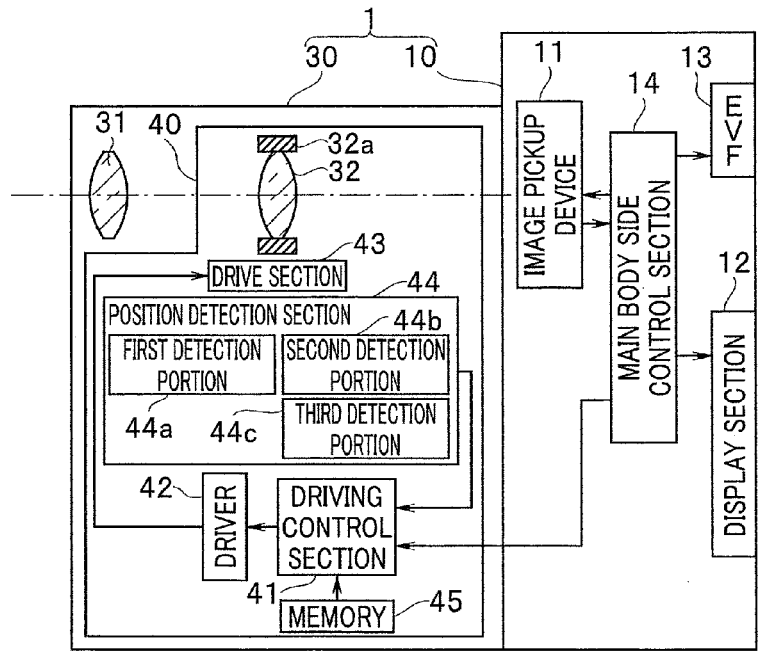
FIG. 2 is a main part schematic configuration diagram illustrating a main part of an inner configuration of the image pickup apparatus in FIG. 1.
Figure 3:
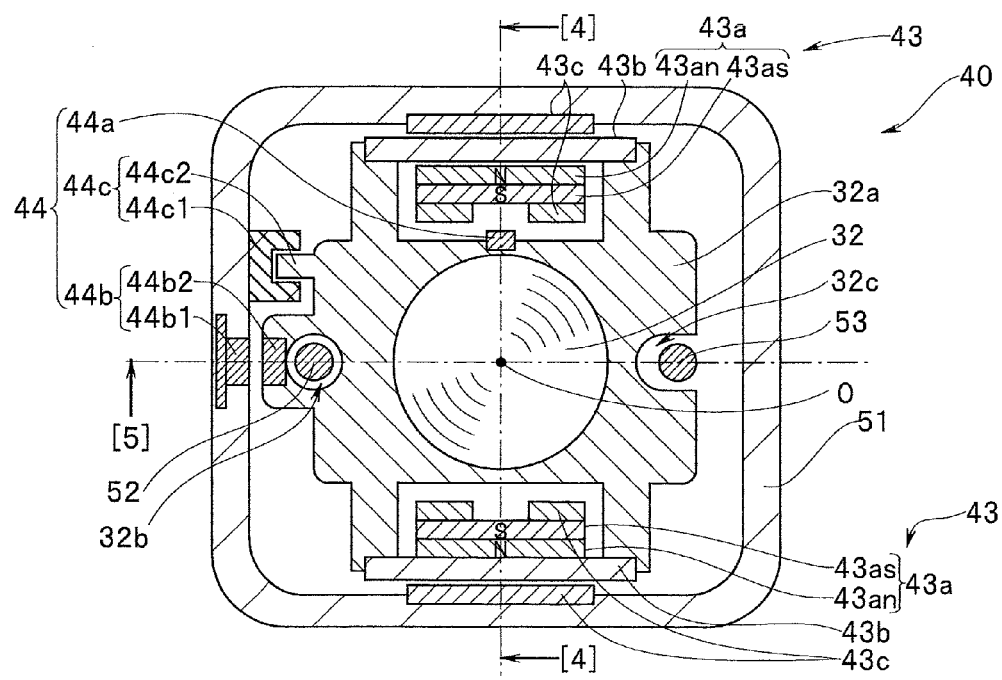
FIG. 3 is a cross-sectional view schematically illustrating a cross section along [3]-[3] line in FIG. 1.
Figure 4:
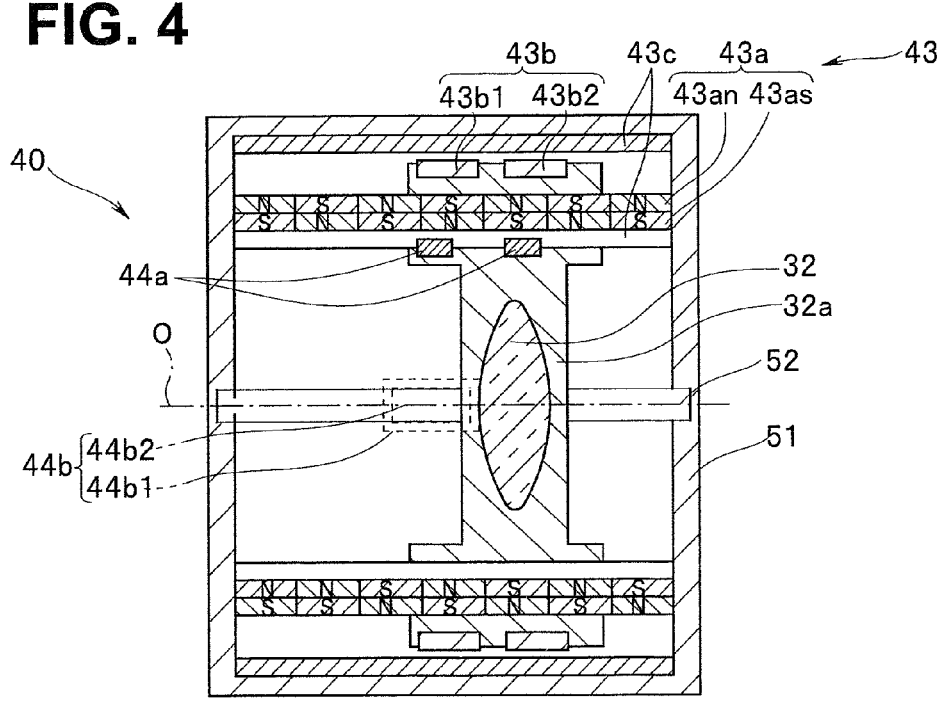
FIG. 4 is a schematic cross-sectional view along [4]-[4] line in FIG. 3.
Figure 5:
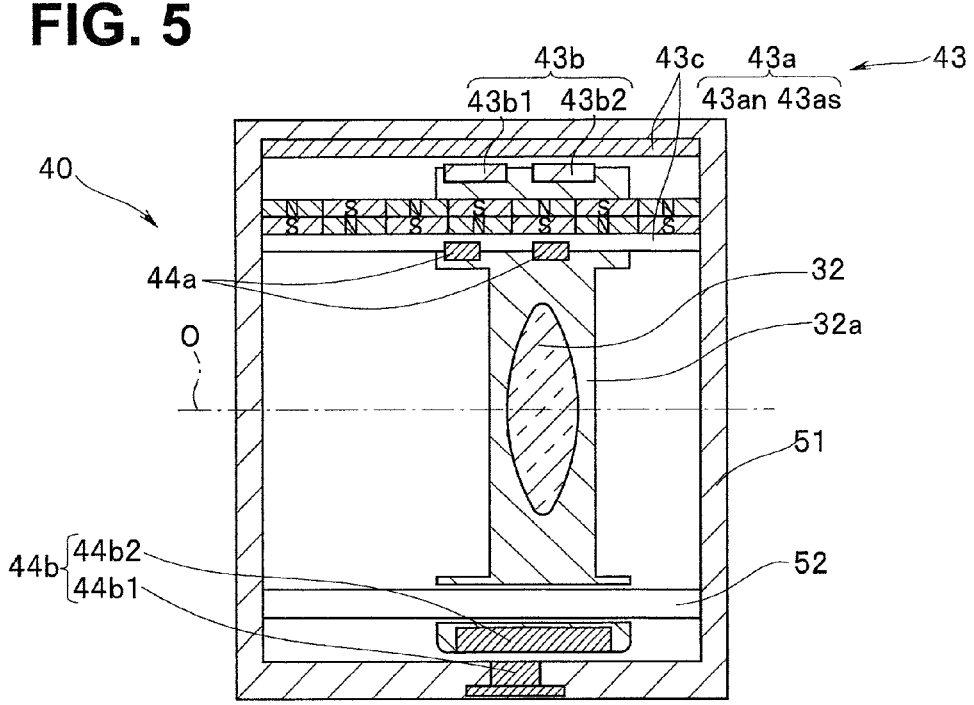
FIG. 5 is a schematic cross-sectional view along [4]-O-[5] line in FIG. 3.

FIG. 1 is a schematic configuration diagram illustrating an overall configuration of an image pickup apparatus according to one embodiment of the present invention. FIG. 2 is a main part schematic configuration diagram illustrating a main part of an inner configuration of the image pickup apparatus in FIG. 1 FIG. 3 is a cross-sectional view schematically illustrating a cross section along [3]-[3] line in FIG. 1. FIG. 4 is a schematic cross-sectional view along [4]-[4] line in FIG. 3. FIG. 5 is a schematic cross-sectional view along [4]-O-[5] in FIG. 3.

Note that, in FIGS. 1 to 5, just the gist of the present embodiment is illustrated and illustrations of detailed configurations which do not directly relate to the present invention are omitted. It is supposed that the configuration parts illustrations of which are omitted are the same as those applied to conventional image pickup apparatuses, and detailed descriptions thereof will be also omitted.

In the one embodiment of the present invention and the respective drawings showing the embodiment, the optical axis of the image pickup optical system in the lens barrel is denoted by the reference sign O. In the direction along the optical axis O, the side on which an object is placed and which is opposed to the front face of the image pickup apparatus is referred to as "forward", and the opposite direction of the direction in which the light-receiving face (image-forming face) of the image pickup device disposed inside the image pickup apparatus faces is referred to as "rearward" or "rear face side".

First, the configuration of the image pickup apparatus according to the one embodiment of the present invention will be briefly described below by mainly referring to FIGS. 1 and 2.

As shown in FIGS. 1 and 2, the image pickup apparatus 1 according to the present embodiment is configured mainly by an apparatus main body 10 and a lens barrel 30. The apparatus main body 10, for example, includes: an image pickup unit including an image pickup device 11, an electronic circuit that drives the image pickup device, etc.; a display unit that includes a display section 12, an electronic circuit that drives the display section, etc.; an EVF (electronic viewfinder) unit 13 including a small display panel 13a, an electronic circuit that drives the small display panel, a finder ocular lens 13b for magnified observation of the display on the small display panel 13a, etc.; and in addition, a main body side control section 14 that generally controls the entirety of the image pickup apparatus 1.

The constituent units such as the image pickup unit, the display unit, and the EVF unit 13, and the like applied to the present embodiment are common ones to be applied to conventional image pickup apparatuses. In addition, also the basic configuration of the main body side control section 14 is substantially the same as that of the one to be applied to the conventional image pickup apparatuses. The characteristic configuration of the main body side control section 14 in the present embodiment will be described later.

The lens barrel 30, for example, includes: an image pickup optical system configured by a plurality of lens groups (31, 32); a plurality of lens holding frames (only the reference sign 32a is shown in the drawings) that respectively hold the lens groups that constitute the image pickup optical system; a lens driving unit 40 for moving the lens holding frame 32a that holds the lens group 32, which is among the plurality of lens groups of the image pickup optical system, in a direction along the optical axis O; and other components.

The configuration of the lens driving unit 40 will be detailed below with reference to FIGS. 2 to 5. The lens driving unit 40 according to the present embodiment is configured to cause the lens holding frame 32a that holds, for example, the focus lens group 32, which is used for focus adjusting action and which is among the plurality of lens groups (31, 32) constituting the image pickup optical system, to move forward or backward in a predetermined direction (forward/backward direction) in the direction along the optical axis O by a predetermined amount at a predetermined timing. The lens holding frame 32a is configured as a movable frame that moves with respect to the fixed frame (housing frame 51) to be described later.

The lens driving unit 40 is configured by electric components (see mainly FIG. 2) including a driving control section 41, a driver 42, a drive section 43, a position detection section 44, a memory 45, etc., and mechanical components (see mainly FIGS. 3 to 5) including the housing frame 51 (fixed frame), the lens holding frame 32a that holds the focus lens group 32, a main shaft 52, an auxiliary shaft 53, etc.

The driving control section 41 of the electric components is a control circuit that controls the lens driving unit 40 under the control by the main body side control section 14.

The driver 42 is an electronic circuit that receives a control signal from the driving control section 41 and supplies current to the drive section 43 to be driven. Note that the driver 42 includes a pair (plurality) of drivers A and B provided so as to correspond respectively to a first coil 43b1 and a second coil 43b2 (to be described later) in the driving coil 43b (see FIG. 6).

The drive section 43 is an actuator for driving the lens holding frame 32a in the lens driving unit 40. The drive section 43 according to the present embodiment employs a linear actuator called VCM (voice coil motor), for example.

Specifically, as shown in FIGS. 3 to 5, the drive section 43 is provided in pairs (in plurality) so as to be located at positions opposed to each other across the optical axis O. Each of the plurality of drive sections 43 is configured by a driving magnet 43a, a driving coil 43b, yokes 43c, and the like.

The driving magnet 43a is fixed to a fixed part of the housing frame 51 (fixed frame) so as to extend in the direction parallel to the optical axis O of the image pickup optical system. The driving magnet 43a is configured such that the magnetic poles are alternately reversed along the optical axis O. Note that, in FIGS. 3 to 5, the part denoted by the reference sign N is shown as the N-pole, and the part denoted by the reference sign S is shown as the S-pole. For convenience sake, the part having a magnetism of the N-pole is attached with the reference sign 43an, and the part having a magnetism of the S-pole is attached with the reference sign 43as.

As described above, the drive section 43 is provided in plurality, and in accordance with the plurality of drive sections 43, the driving magnet 43a is also provided in plurality. In this case, the plurality of driving magnets 43a are disposed at predetermined sites of the housing frame 51 as a fixed frame, so as to be located respectively at positions opposed to each other across the optical axis O. The magnetic poles of the driving magnets 43a are configured to be line-symmetric with respect to the linear line including the optical axis O.

The driving coil 43b is disposed in plurality (in plural pairs, reference signs 43b1, 43b2; see FIGS. 4 and 5) at the fixed parts of the lens holding frame 32a such that the respective pairs of coils are located at positions opposed respectively to the plurality of driving magnets 43a. That is, one of the plural pairs of the driving coils 43b is configured by a plurality (pair) of coils, i.e., a first coil 43b1 and a second coil 43b2 which correspond to one of the plurality (two) of the driving magnets 43a. The coil 43b1 and the coil 43b2 are arranged so as to align in the direction along the optical axis O. In this case, the first coil 43b1 and the second coil 43b2 are disposed at positions at which the cycles of the magnetic poles of one of the driving magnets 43a are shifted. In the present embodiment, specifically, the two coils (first coil 43b1 and second coil 43b2) of the one of the plural pairs of driving coils 43b are arranged at positions at which the cycles of the magnetic poles of one of the driving magnets 43a are shifted by ¼ cycle or ¾ cycle, for example. Note that the other pair of the plurality of (two) driving coils 43b has a configuration identical to the above-described configuration.

The yokes 43c are made of iron, steel, or the like. The yokes 43c are members which constitute a magnetic circuit, together with the driving magnet 43a. The yokes 43c are disposed in order to increase adsorption force and performance of the magnet. The yokes 43c are respectively disposed at the fixed parts of the housing frame 51 so as to surround the driving magnet 43a and the driving coil 43b.

The position detection section 44 includes a first detection portion 44a, a second detection portion 44b, and a third detection portion 44c.

The first detection portion 44a is a position detection sensor that detects the position of the driving magnet 43a in order to drive and control the drive section 43. Therefore, as the first detection portion 44a, magnetic sensors such as a plurality of hall elements are used, for example. The first detection portion 44a is fixed to the lens holding frame 32a as a movable frame and arranged at the site opposed to the driving magnet 43a. In the present embodiment, a plurality of (two in the present embodiment) hall elements are arranged on the lens holding frame 32a in the direction along the optical axis O at a predetermined interval. The first detection portion 44a constituted of the two hall elements detects the magnetic poles of the driving magnet 43a fixed to the housing frame 51.

The second detection portion 44b is a position detection sensor that detects the position of the lens holding frame 32a (movable frame) for performing driving control of the drive section 43 after the third detection portion 44c (to be detailed later) detects the absolute position of the lens holding frame 32a (movable frame) by the driving control of the drive section 43 based on the output from the first detection portion 44a. As the second detection portion 44b, a magnetic sensor (magnetism detecting element), for example, a GMR (giant magneto resistive effect) element is applied. That is, in detail, the second detection portion 44b includes a GMR element 44b1 and a magnet for position detection 44b2. In the present embodiment, an example is shown in which the GMR element 44b1 is fixed to the housing frame 51 (fixed frame), and the magnet for position detection 44b2 is fixed to the lens holding frame 32a (movable frame). Note that the arrangement of the GMR element 44b1 and the magnet for position detection 44b2 are not limited to this example, and the GMR element 44b1 may be disposed at the lens holding frame 32a (movable frame) and the magnet for position detection 44b2 may be disposed at the housing frame 51 (fixed frame).

The third detection portion 44c is a position detection sensor provided for detecting the absolute position on a line along the optical axis O of the lens holding frame 32a as a movable frame. As the third detection portion 44c, a photo-interrupter (PI) or the like is applied, for example. That is, in detail, the third detection portion 44c includes a PI element 44c1 and a light-shielding convex portion 44c2. In the present embodiment, an example is shown in which the PI element 44c1 is fixed to the housing frame (fixed frame) 51, and the light-shielding convex portion 44c2 is fixed to the lens holding frame 32a (movable frame). Note that also the arrangement of the PI element 44c1 and the light-shielding convex portion 44c2 is not limited to the example, and the PI element 44c1 may be disposed at the lens holding frame 32a (movable frame) and the light-shielding convex portion 44c2 may be disposed at the housing frame 51 (fixed frame).

The memory 45 is a storage medium that stores in advance various kinds of data unique to the lens barrel 30. The various kinds of data stored in the memory 45 are read out as needed by the driving control section 41 and used for various kinds of control.

The housing frame 51 among the mechanical components is a fixed frame that holds the respective components constituting the lens driving unit 40 and covers the outer surfaces of the respective components.

The lens holding frame 32a is a lens holding frame that holds the focus lens group 32, as described above. The lens holding frame 32a is disposed so as to be movable only in the direction along the optical axis O by the main shaft 52 and the auxiliary shaft 53, inside the housing frame 51.

The main shaft 52 is a shaft member that holds the lens holding frame 32a such that the lens holding frame 32a is movable only in the direction along the optical axis O inside the housing frame 51. Both ends of the main shaft 52 are fixed such that the main shaft 52 is stretched inside the housing frame 51. The main shaft 52 is arranged so as to be inserted through a through hole 32b (see FIG. 3) pierced in the lens holding frame 32a in the direction along the optical axis O. According to such a configuration, the lens holding frame 32a is held slidably along the main shaft 52.

The auxiliary shaft 53 is a shaft member that guides the movement of the lens holding frame 32a in the direction along the optical axis O in the housing frame 51, and also functions as a rotation stopper that prevents the lens holding frame 32a from rotating with the shaft center of the main shaft 52 as a rotation center. Both ends of the auxiliary shaft 53 are fixed such that the auxiliary shaft 53 is stretched inside the housing frame 51. The auxiliary shaft 53 is arranged so as to be inserted through a groove portion 32c (see FIG. 3) of the lens holding frame 32a, the groove portion extending in the direction along the optical axis O. Note that the auxiliary shaft 53 is arranged at a position opposed to the main shaft 52 across the optical axis O. That is, the through hole 32b and the groove portion 32c provided on the lens holding frame 32a are also disposed at the sites opposed to each other across the optical axis O. According to such a configuration, the lens holding frame 32a is held by the main shaft 52 so as to be slidable in the direction along the optical axis O, guided by the auxiliary shaft 53 to move in the direction along the optical axis O and at the same time prevented by the auxiliary shaft 53 from rotating with the shaft center of the main shaft 52 as a rotation center. Therefore, the lens holding frame 32a is disposed so as to be able to move forward or backward only in the direction along the optical axis O.

The main configuration of the image pickup apparatus 1 according to the present embodiment is as described above. It is supposed that, with regard to other configurations whose illustration and detailed description are omitted, substantially the same configurations as those in conventional common image pickup apparatuses are applied to the image pickup apparatus 1. Note that, in the configuration according to the present embodiment, an example of what is called a moving coil (MC) is shown as the configuration of the drive section 43, in which the driving magnet 43a is provided at the housing frame 51 (fixed frame) and the driving coil 43b is provided at the lens holding frame 32a (movable frame). However, the configuration of the drive section 43 is not limited to the example. As the configuration of the drive section 43 other than the configuration in the above-described example, an example of what is called a moving magnet (MM) may be applied, in which the driving coil 43b is provided at the housing frame 51 (fixed frame) and the driving magnet 43a is provided at the lens holding frame 32a (movable frame).

Next, description will be made below on the detailed configuration of the driving control section 41 included in the lens driving unit 40 in the image pickup apparatus 1 according to the present embodiment, and the flow of the lens driving control executed by the driving control section 41.

Figure 6:
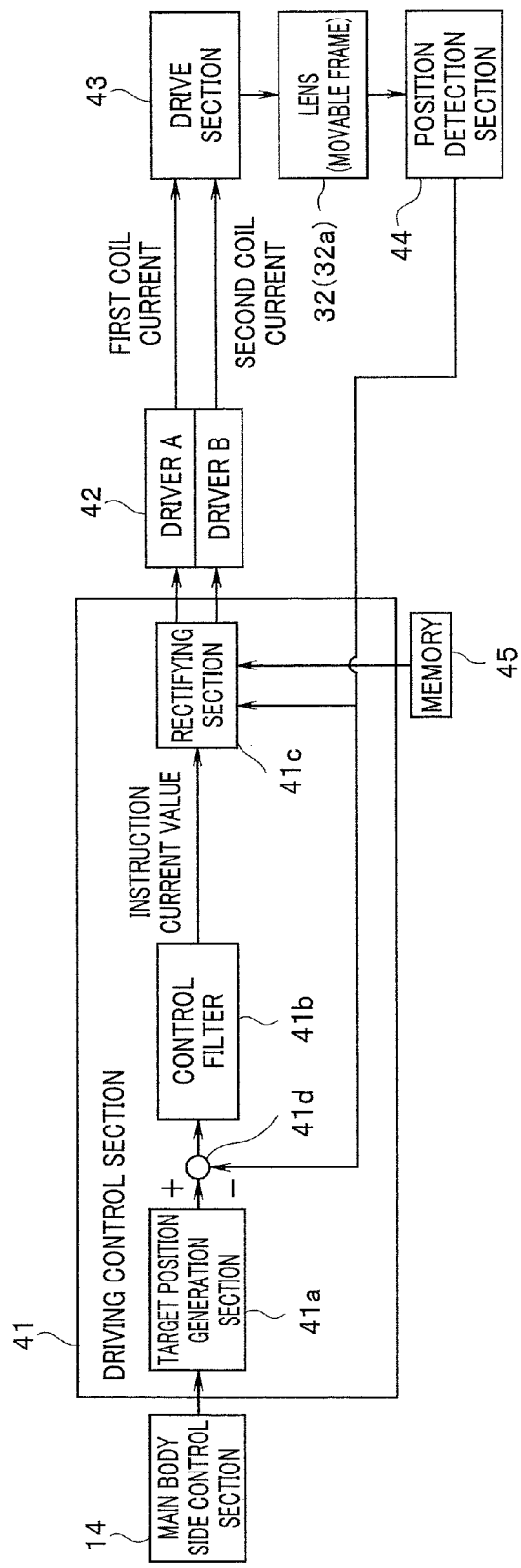
FIG. 6 is a block configuration diagram illustrating a main configuration part focusing on a driving control section that drives a lens driving unit in an electrical configuration block in the image pickup apparatus in FIG. 1.

FIG. 6 is a block configuration diagram illustrating a main configuration part focusing on the driving control section that drives the lens driving unit in the electrical configuration block in the image pickup apparatus 1 according to the present embodiment.

In the image pickup apparatus 1 according to the present embodiment, the main body side control section 14 controls the entirety of the image pickup apparatus, as described above. Roughly speaking, the lens driving control processing of the focus lens group 32 at the time of focusing is performed as follows.

When the image pickup apparatus 1 is activated by turning on the power supply, the image pickup apparatus 1 is brought into an image pickup standby state in which the image pickup apparatus 1 is capable of executing an image pickup action. In this state, for example, the image pickup device 11 of the image pickup unit receives optical images formed by the image pickup optical system and sequentially executes photoelectric conversion processing on the received optical images at a predetermined interval. The image pickup signals generated at this time are sequentially transmitted to the main body side control section 14 and subjected to predetermined signal processing, and thereafter sent as image data to the display section 12 or the EVF unit 13. As a result, what is called a live-view image is displayed.

In such an image pickup standby state, the focusing operation (for example, half-pressing operation of the shutter release button, touch operation of the display panel, or the like) by a user is performed at an arbitrary timing. Upon receiving an instruction signal, the main body side control section 14 executes predetermined autofocusing action (hereinafter abbreviated as AF action) processing.

One example of such an AF action is, what is called, a phase difference detection AF action processing in which phase difference detection of a desired object image is performed by using a distance measuring device, not shown, for example, to calculate a moving direction in the direction along the optical axis O and a moving amount of (the lens holding frame 32a that holds) the focus lens group 32. In this case, the main body side control section 14 is capable of obtaining information on the target position (to be described later) at which focus adjusting has to be performed, without executing lens driving control processing.

Another example of the AF action is, what is called, a contrast AF action processing in which the focus position of a desired object image is detected by comparing contrasts of the picked-up images picked up by the image pickup device 11 while moving, for example, (the lens holding frame 32a that holds) the focus lens group 32 forward or backward in the direction along the optical axis O. In this case, the main body side control section 14 obtains information on the target position (to be described later) at which focus adjusting has to be performed by executing the contrast AF processing while executing the lens driving control processing.

The information related to the focus adjusting (hereinafter shortly referred to as focus adjusting information), which has been obtained as described above, is transmitted from the main body side control section 14 to the driving control section 41 in the lens barrel 30.

The driving control section 41 includes, as shown in FIG. 6, a target position generation section 41a, a control filter 41b, and a rectifying section 41c, an adder 41d, and etc.

The target position generation section 41a is an arithmetic circuit that generates data including the moving amount of the lens holding frame 32a (movable frame) to the movement target position, at the time of focus adjusting action, based on focus adjusting information (information including a result of distance measurement, etc.) from the main body side control section 14.

The adder 41d is an adding circuit that calculates a deviation from a difference between the information signal from the target position generation section 41a and the position information signal from the position detection section 44.

The control filter 41b is an arithmetic circuit that receives the above-described deviation and calculates an instruction current value by performing phase compensation/gain multiplication processing with an IIR filter incorporated in the control filter 41b.

The rectifying section 41c is an arithmetic circuit that sets setting values such as the current direction ("positive" (plus) direction or "negative" (minus) direction), the waveform (square wave, sine wave, or the like), or switching timing of the current direction according to the switching positions of the magnetic poles, with regard to the supply currents to be supplied to the two coils (the first coil 43b1 and the second coil 43b2), based on the arithmetic result (instruction current value) by the control filter 41b, the position information obtained by the position detection section 44, and the like. Note that the rectifying section 41c is configured to receive also the information stored in advance in the memory 45.

When the driving control section 41 thus sets the setting values of the supply currents to be applied to the two coils (the first coil 43b1 and the second coil 43b2), the setting instruction is sent to the two drivers A and B of the driver 42. Upon receiving the setting instruction, the two drivers A and B of the driver 42 supply the set currents to the drive section 43. That is, the one driver A supplies the driving current to the first coil 43b1, and the other driver B supplies the driving current to the second coil 43b2. Upon receiving the driving currents, the drive section 43 moves the lens holding frame 32a (movable frame) in a predetermined direction in the direction along the optical axis O by a predetermined amount. The position information that varies with the movement of the lens holding frame 32a is detected by the position detection section 44. The position detection information detected by the position detection section 44 is fed back to the driving control section 41 for each detection.

Description will be made below on the working at the time of moving the lens holding frame 32a (movable frame) that holds the focus lens group 32 in the direction along the optical axis O, when the AF action is performed in the image pickup apparatus 1 according to the present embodiment configured as described above.

Figure 7:
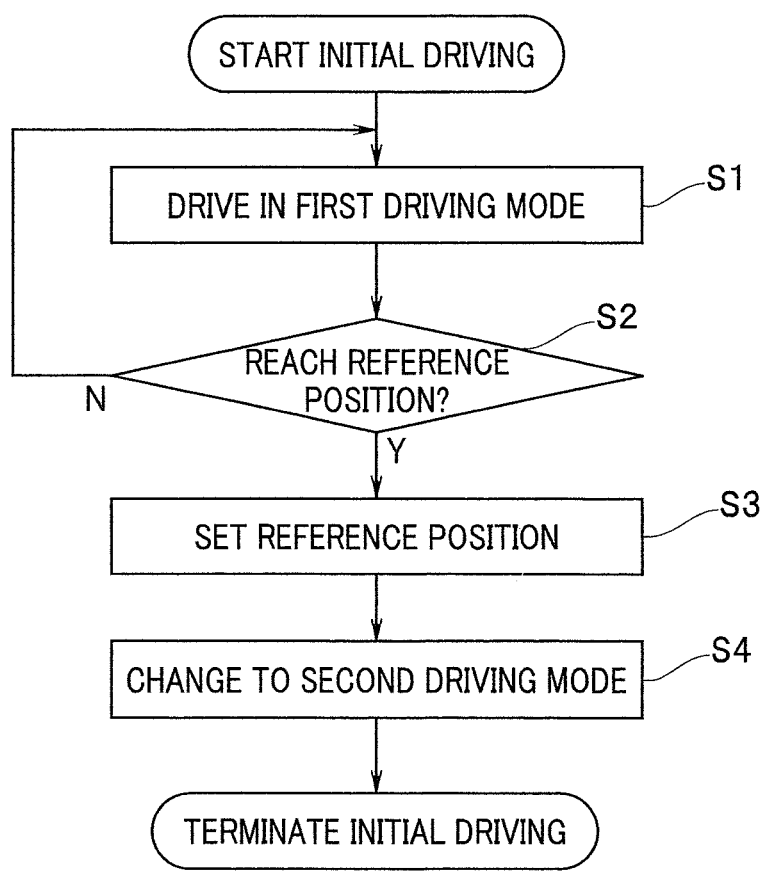
FIG. 7 is a flowchart showing initial driving processing of lens driving control in the image pickup apparatus in FIG. 1.

FIG. 7 is a flowchart showing initial driving processing of lens driving control in the image pickup apparatus according to the present embodiment. FIG. 8 is a flowchart of a first driving mode among modes of the lens driving control processing. FIG. 9 is a table showing an example of state data to be referred to in the processing in the first driving mode in FIG. 8.

Figure 10:
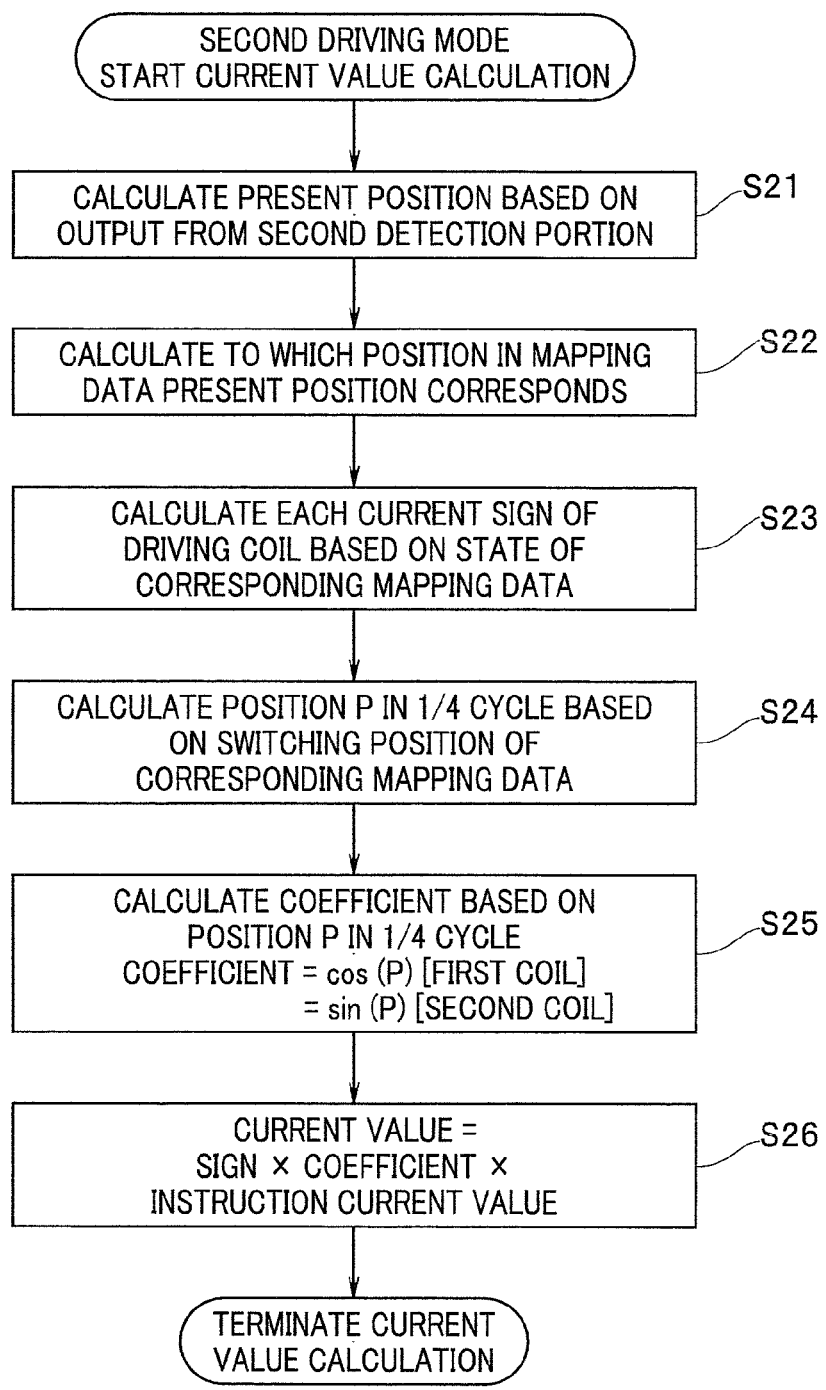
FIG. 10 is a flowchart of a second driving mode among the modes of the lens driving control processing in the image pickup apparatus in FIG. 1.
Figure 11:
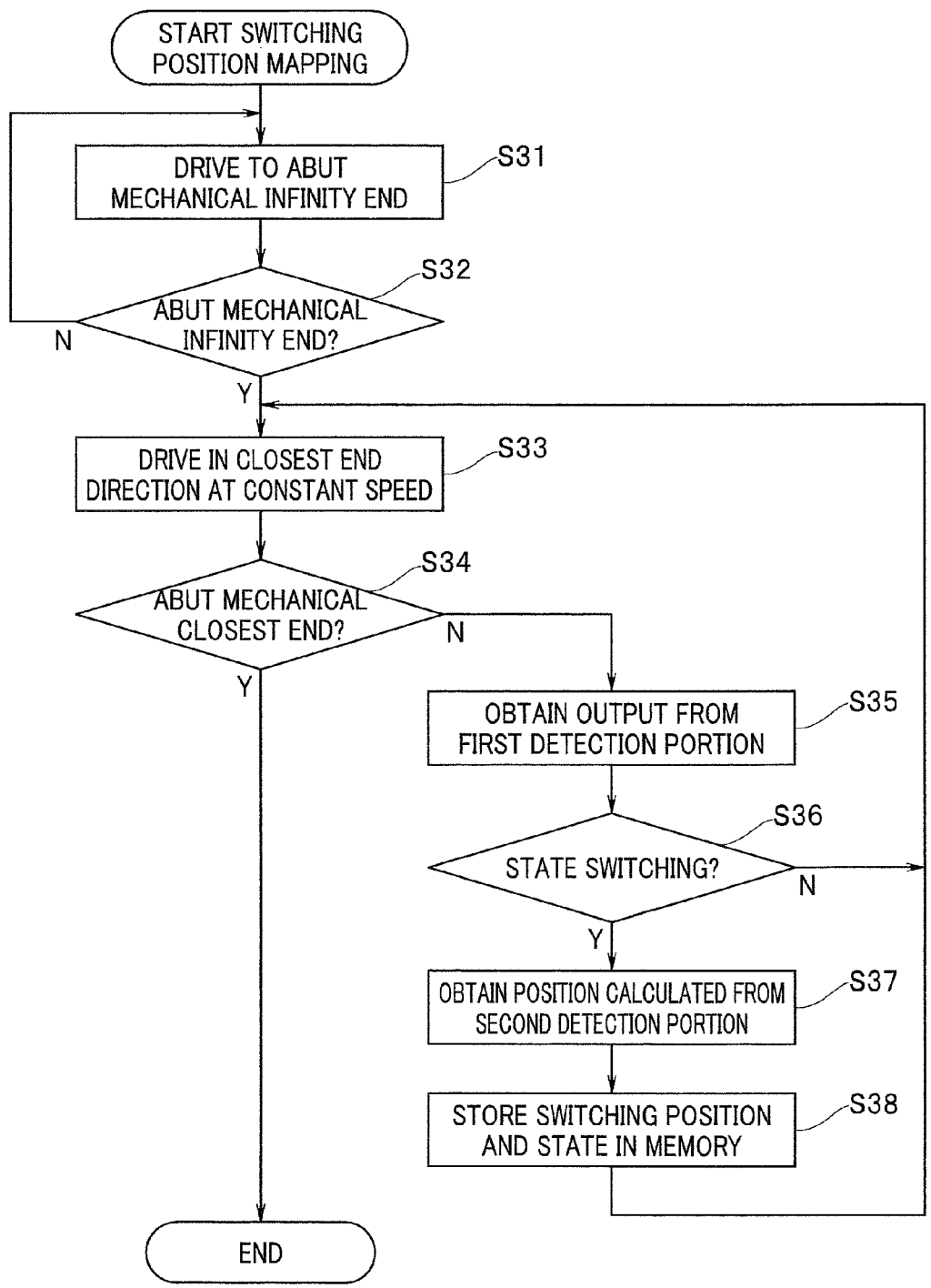
FIG. 11 is a flowchart of processing for obtaining switching position mapping data to be referred to in the second driving mode in FIG. 10.
Figures 12, 13:
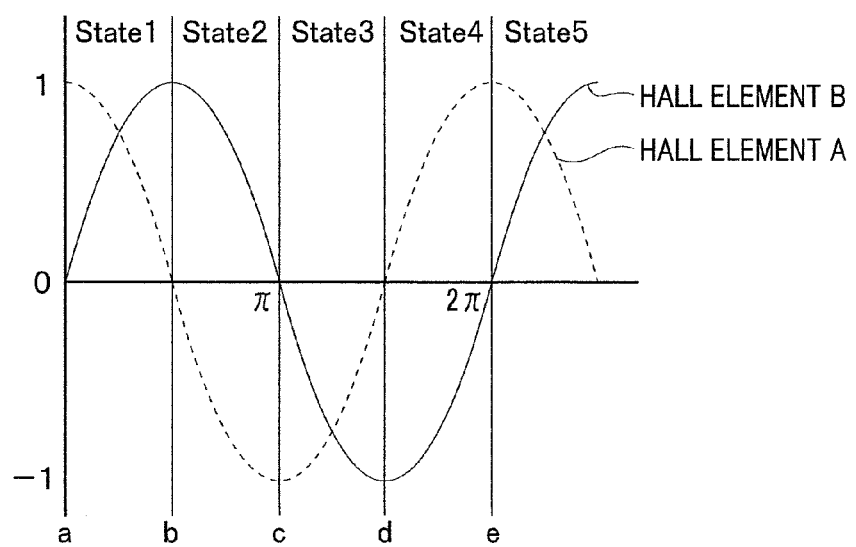
FIG. 12 is a table showing an example of the mapping data generated in the processing for obtaining the switching position mapping data in FIG. 11.
FIG. 13 is an illustration diagram illustrating mapping data in output (sine wave) of a first detection section (two hall elements).

FIG. 10 is a flowchart of a second driving mode among modes of the lens driving control processing. FIG. 11 is a flowchart of processing for obtaining switching position mapping data to be referred to in the second driving mode in FIG. 10. FIG. 12 is a table showing an example of the mapping data generated in the obtaining processing of the switching position mapping data in FIG. 11. FIG. 13 is an illustration diagram illustrating mapping data in output (sine wave) of the first detection section (two hall elements).

When the AF action is performed in the image pickup apparatus 1 according to the present embodiment, for example, the lens driving control is performed first in the first driving mode. The first driving mode is a mode for the lens driving control which is performed based on the position detection result obtained by the first detection portion 44a. In the first driving mode, a predetermined reference position (for example, end portion in the movable range or the absolute position set in advance) is set. The reference position is detected by the third detection portion 44c (PI element 44c1, light-shielding convex portion 44c2), or the end portion in the mechanical movable range is set as the reference position (see FIGS. 7 and 8).

The reference position is thus set, and then the mode of the lens driving control is switched from the first driving mode to the second driving mode. The second driving mode is a mode for the lens driving control for driving the lens holding frame 32a to a desired target position set by the AF action based on the position detection result obtained by the second detection portion 44b (GMR element 44b1, magnet for position detection 44b2) (second driving mode; see FIGS. 12 and 13).

First, the initial driving processing of the lens driving control processing in the image pickup apparatus 1 according to the present embodiment will be described with reference to the flowchart in FIG. 7.

When the image pickup apparatus 1 is activated to be brought into the image pickup standby state, the focusing operation (half-pressing of the shutter release button, touch operation of the display panel, or the like) is performed by a user, thereby causing the main body side control section 14 to start executing a predetermined AF action processing.

In step S1 in FIG. 7, the main body side control section 14 executes the lens driving control in the first driving mode (for details, see FIG. 8 to be described later).

Next, in step S2, the main body side control section 14 confirms whether or not the lens holding frame 32a reaches a predetermined reference position by checking the output from the third detection portion 44c. The predetermined reference position in the present embodiment is one of the end portions in the moving range of the lens holding frame 32a as a movable frame, or a predetermined position set in advance, for example. The reference position serves as the position information which is a reference in the lens driving control performed by the second detection portion 44b in the second driving mode.

In step S3, the main body side control section 14 sets the predetermined reference position detected in the processing in the above-described step S2 as the reference position.

Then, in step S4, the main body side control section 14 switches the mode of the lens driving control, to change the mode to the second driving mode. Then, the main body side control section 14 terminates the initial driving processing of the lens driving control processing.

Next, the first driving mode processing (processing in the step S1 in FIG. 7) of the lens driving control processing will be described below with reference to the subroutine in FIG. 8. The first driving mode processing is processing for calculating a current value of the current to be supplied to the drive section 43 for driving the lens holding frame 32a as a movable frame in the direction along the optical axis O, based on the output signal from the first detection portion 44a. In this case, the main body side control section 14 obtains the output signal from the first detection portion 44a (hall elements) in step S11.

Next, in step S12, the main body side control section 14 calculates a state based on the output signal from the first detection portion 44a (hall elements) obtained in the processing in the step S11. The state in the present embodiment means regions (states 1 to 4, etc.) set in a range of the output waveform of the first detection portion 44a (hall elements) (see FIG. 12).

In step S13, the main body side control section 14 calculates the current signs (whether the signs are "positive" (plus) or "negative" (minus)) of the first coil 43b1 and the second coil 43*b*2 according to the obtained state. The relation between the obtained state and the signs of the currents applied to the two respective coils (43*b*1, 43*b*2) is as shown in FIG. 9, for example.

In step S14, the main body side control section 14 calculates the current values of the currents to be supplied to the first coil 43*b*1 and the second coil 43*b*2 of the drive section 43 by arithmetic operation. In the present embodiment, the current values are calculated as shown below.

current value=sign×instruction current value

This arithmetic operation processing is performed by the rectifying section 41*c*, as described above. That is, the instruction current value is the arithmetic result obtained by the control filter 41*b*, as described above. In addition, the sign is set based on the position information obtained in the above-described step S11 by the first detection portion 44*a* in the position detection section 44 (state; see FIG. 9 and FIG. 10). The processing is performed by the rectifying section 41*c*, as described above. Then, the current value calculation processing in the first driving mode is terminated.

Next, the second driving mode processing of the lens driving control processing will be described below with reference to the flowchart in FIG. 10. The second driving mode processing is processing for calculating the current value of the current to be supplied to the drive section 43 for driving the lens holding frame 32*a* as a movable frame in the direction along the optical axis O, based on the output signal from the second detection portion 44*b*.

In step S21, the main body side control section 14 calculates the present position of the lens holding frame 32*a* based on the output signal from the second detection portion 44*b* (GMR element 44*b*1, magnet for position detection 44*b*2). The present position of the lens holding frame 32*a* is a relative position from the reference position set by the above-described processing in the step S3 in FIG. 7.

In step S22, the main body side control section 14 calculates to which position the present position calculated by the processing in the step S21 corresponds in previously measured switching position mapping data (to be described later).

In the present embodiment, the switching position mapping data is data obtained by performing predetermined mapping processing in advance and stored in the memory 45 or the like. The flowchart of the switching position mapping processing is shown in FIG. 11. The switching position mapping processing is performed on the individual apparatus at the time of manufacturing the image pickup apparatus 1 (lens barrel 30), and the data obtained by the processing is stored in the memory 45 in the individual apparatus.

In step S31 in FIG. 11, the main body side control section 14 controls the driving control section 41 to drive the lens holding frame 32*a* in a predetermined direction along the optical axis O, by way of the driver 42 and the drive section 43. At this time, the lens holding frame 32*a* is driven until the lens holding frame 32*a* reaches (abuts) one of the end portions within the movable range, for example, the mechanical infinity end.

In step S32, the main body side control section 14 confirms whether or not the lens holding frame 32*a* has reached (abutted) the mechanical infinity end position. The detection whether the lens holding frame 32*a* has reached the mechanical infinity end position can be performed also by the second detection portion 44*b*. That is, when the movable frame (lens holding frame 32*a*) reaches the mechanical infinity end position, the second detection portion 44*b* continuously outputs a constant value. Thus, when it is confirmed that the lens holding frame has reached the mechanical infinity end position, the processing procedure proceeds to the processing in the next step S33. Note that, if it is not confirmed that the lens holding frame reaches the mechanical infinity end position, the processing procedure returns to the processing in the step S31 and the same processing is repeated until it is confirmed that the lens holding frame reaches the mechanical infinity end position.

In step S33, the main body side control section 14 drives the lens holding frame 32*a* to move the lens holding frame from the mechanical infinity end position to the closest end position at a certain speed.

Next, in step S34, the main body side control section 14 confirms whether or not the lens holding frame 32*a* has reached (abutted) the mechanical closest end position by checking the output from the third detection portion 44*c*, for example. When it is confirmed that the lens holding frame 32*a* has reached the mechanical closest end position, a series of processing procedure is terminated. If it is not confirmed that the lens holding frame 32*a* reaches the mechanical closest end position, the processing procedure proceeds to the next step S35, and the processings in the step S35 and subsequent steps are repeated until it is confirmed that the lens holding frame has reached the mechanical closest end position.

In step S35, the main body side control section 14 obtains the output signal from the first detection portion 44*a*.

Subsequently, in step S36, the main body side control section 14 detects the switching of the state based on the output signal from the first detection portion 44*a* which has been obtained in the processing in the step S35. When the switching of the state has been detected, the processing procedure proceeds to the next step S37. Note that when the switching of the state is not detected, the processing procedure returns to the step S33, and the processings in the step S33 and subsequent steps are repeated until the switching of the state is detected.

In step S37, the main body side control section 14 obtains position data calculated based on the output signal from the second detection portion 44*b*. The position data obtained in this step serves as the switching position mapping data. For example, in the examples of the mapping data shown in FIGS. 12, 13, the switching positions a, b, c, d, and e are shown.

Subsequently, in step S38, the main body side control section 14 stores and saves the list (see FIG. 12, for example) in which the switching position data obtained as described above and the state data are associated with each other, in the memory 45 as the switching position mapping data. Then, the processing procedure returns to the step S33, and the processings in the step S33 and subsequent steps are repeated until the lens holding frame 32*a* reaches the mechanical closest end.

Referring back to FIG. 10, in step S23, the main body side control section 14 refers to the switching position mapping data read from the memory 45, to calculate the current signs of the currents to be supplied to the two coils (the first coil 43*b*1 and the second coil 43*b*2) of the driving coil 43*b* based on the state of the mapping data corresponding to the present position.

Subsequently, in step S24, the main body side control section 14 similarly refers to the switching position mapping data, to calculate the position data P in ¼ cycle based on the switching position of the mapping data corresponding to the present position.

Next, in step S25, the main body side control section 14 calculates coefficients by using the formulae shown below based on the position data P in the ¼ cycle which has been calculated by the processing in the step S24.

$$\text{coefficients} = \cos(P)[\text{first coil}]$$
$$= \sin(P)[\text{second coil}]$$

Then, in step S26, the main body side control section 14 calculates the current values of the currents to be supplied to the two coils (the first coil 43b1 and the second coil 43b2) of the driving coil 43b. In this calculation, the formula, "current value=sign×coefficient×instruction current value" is applied.

Then, the current value calculation processing in the second driving mode is terminated.

As described above, according to the one embodiment, the image pickup apparatus 1 includes the lens driving unit 40 that causes the lens holding frame 32a (movable frame) for holding the lens group 32, which is a part of the plurality of lens groups constituting the image pickup optical system, to move in the direction along the optical axis O with respect to the housing frame 51 as a fixed frame, the image pickup apparatus 1 further includes: a plurality of driving magnets 43a formed so as to extend in the direction parallel to the optical axis O of the image pickup optical system and arranged on the housing frame 51 such that the magnetic poles are alternately reversed along the optical axis O; a plurality of driving coils 43b arranged on the lens holding frame 32a so as to be opposed respectively to the plurality of driving magnets 43a at the positions where the cycles of the magnetic poles of the driving magnets 43a are shifted (by ¼ cycle or ¾ cycle, for example) in the direction along the optical axis O; a plurality of first detection portions 44a which are mounted to the lens holding frame 32a and which detect the position of the lens holding frame 32a with respect to the housing frame 51 by detecting the change of the magnetic force of the plurality of driving magnets 43a; and the second detection portion 44b which detects the relative position of the lens holding frame 32a with respect to the housing frame 51, and the image pickup apparatus 1 is configured such that, when it is detected that the lens holding frame 32a has reached a predetermined position with respect to the housing frame 51, the output signal from the second detection portion 44b at the time of the detection is set as a reference position, and the position detection of the lens holding frame 32a after the detection is performed based on the output signal from the second detection portion 44b.

According to such a configuration, at the time of initial driving, the lens driving control is performed based on the output signal from the first detection portion 44a, and after the detection that the lens holding frame 32a has reached a predetermined position with respect to the housing frame 51, the lens driving control can be performed based on the output signal from the second detection portion 44b.

The first detection portions 44a perform position detection by detecting the change of the magnetic force of the driving magnets 43a which is set to the level required for obtaining necessary driving force. At the time of initial driving, the lens driving control is performed based on the output signals from the first detection portions 44a, to move the lens holding frame 32a to a predetermined reference position (first driving mode).

The second detection portion 44b is a detection portion that is capable of detecting the relative position from the set reference position with high accuracy. The lens driving control is performed based on the output signal from the second detection portion 44b, to move the lens holding frame 32a to a desired position (second driving mode).

Therefore, after setting the predetermined reference position in the first driving mode, the driving mode is switched to the second driving mode, thereby enabling more highly accurate lens driving control to be performed, and enabling variation in the driving force to be prevented. As a result, driving sound, vibration, and the like can be prevented, and smooth lens driving control can be performed.

Note that, in the above-described one embodiment, when the magnetic flux of the driving magnets 43a has a sine wave form, if also the currents to be applied to the driving coils 43b have a sine wave form, the variation in the driving force which can be generated depending on the position of the lens holding frame 32a can be prevented.

In addition, in the first driving mode, the variation in the driving force is large. Therefore, if the driving speed is high, the driving sound, vibration, and the like are likely to be large. During the action in the first driving mode, the driving sound, vibration, and the like may be prevented by limiting the driving speed to equal to or less than a certain speed.

In such a case, the variation in the driving force becomes small in the second driving mode, which prevents the driving sound, vibration, and the like. Therefore, after switching the driving mode to the second driving mode, control may be performed for performing driving at higher speed than the driving speed in the first driving mode.

Note that, the image pickup apparatus 1 according to the above-described embodiment may be configured as, what is called, a lens-changeable type image pickup apparatus in which the apparatus main body 10 and the lens barrel 30 are configured as separated bodies, and the lens barrel 30 is attachable to and detachable from the apparatus main body 10. In addition, as a configuration alternative to the above-described one, the image pickup apparatus may be configured as, what is called, a lens-integrated type image pickup apparatus in which the lens barrel 30 is configured integrally with the main body section (apparatus main body 10) of the image pickup apparatus.

It is needless to say that the present invention is not limited to the above-described embodiment, and various modification and application can be possible within a range without departing from the gist of the invention. Furthermore, the embodiment includes various stages of the invention, and various kinds of invention can be extracted by appropriately combining a plurality of disclosed constituent elements. For example, even if some configuration requirements are deleted from all of the configuration requirements shown in the embodiment, the configuration from which the configuration requirements are deleted can be extracted as an invention if the problem to be solved by the invention can be solved and effects of the invention can be obtained. In addition, constituent elements over different embodiments can be appropriately combined. The present invention is not limited to the above embodiment except as defined in the appended claims.

What is claimed is:

1. An image pickup apparatus comprising:
    a lens holding frame configured to hold a lens and to be movable in a direction along an optical axis of the lens;
    a fixed frame at which the lens holding frame is arranged so as to be movable in the direction along the optical axis of the lens;

a plurality of driving magnets arranged at the fixed frame such that an N-pole and an S-pole are alternately reversed along the optical axis of the lens;

a plurality of driving coils arranged at the lens holding frame so as to be opposed respectively to the plurality of driving magnets, the plurality of driving coils being located at positions where cycles of magnetic poles of the plurality of driving magnets are shifted in the direction along the optical axis;

a plurality of first detection portions mounted to the lens holding frame and configured to detect a position of the lens holding frame with respect to the fixed frame by detecting a change of a magnetic force of the plurality of driving magnets;

a second detection portion configured to detect the position of the lens holding frame with respect to the fixed frame;

a third detection portion configured to detect an absolute position of the lens holding frame with respect to the fixed frame; and a memory that stores mapping data in which data related to a state set based on output from the first detection portions and data set based on an output from the second detection portion and related to a switching position of the state are stored, wherein the lens holding frame is driven based on the output from the first detection portions at a time of initial driving, and when it is detected the third detection portion detects that the lens holding frame reaches a reference position with respect to the fixed frame, an output signal from the second detection portion at the time of the detection is set as the reference position, and the lens holding frame is driven based on a current value calculated from the mapping data stored in the memory and the output signal from the second detection portion.

2. The image pickup apparatus according to claim 1, wherein the plurality of driving coils include two driving coils arranged at the lens holding frame at positions where the cycles of the magnetic poles of the plurality of driving magnets are shifted by ¼ cycle or ¾ cycle.

3. The image pickup apparatus according to claim 1, wherein:

the first detection portions are hall elements that detect the magnetic poles of the plurality of driving magnets, the second detection portion includes a magnetism detecting element mounted to one of the fixed frame and the lens holding frame, and a magnet for position detection mounted so as to be opposed to the magnetism detecting element at one of the lens holding frame and the fixed frame, and the third detection portion is a photo-interrupter.

4. The image pickup apparatus according to claim 3, wherein the magnetism detecting element is a GMR element.

5. The image pickup apparatus according to claim 1, further comprising:

a driving control section that controls currents to be applied to the plurality of driving coils, wherein:

before the lens holding frame reaches the reference position, the driving control section calculates the state based on output signals from the first detection portions and calculates a relation between the state and signs of the currents to be applied to the plurality of driving coils, and the driving control section controls the currents to be applied to the plurality of driving coils based on the sign of the current at the switching position of the state.

* * * * *